No. 742,048. Patented October 20, 1903.

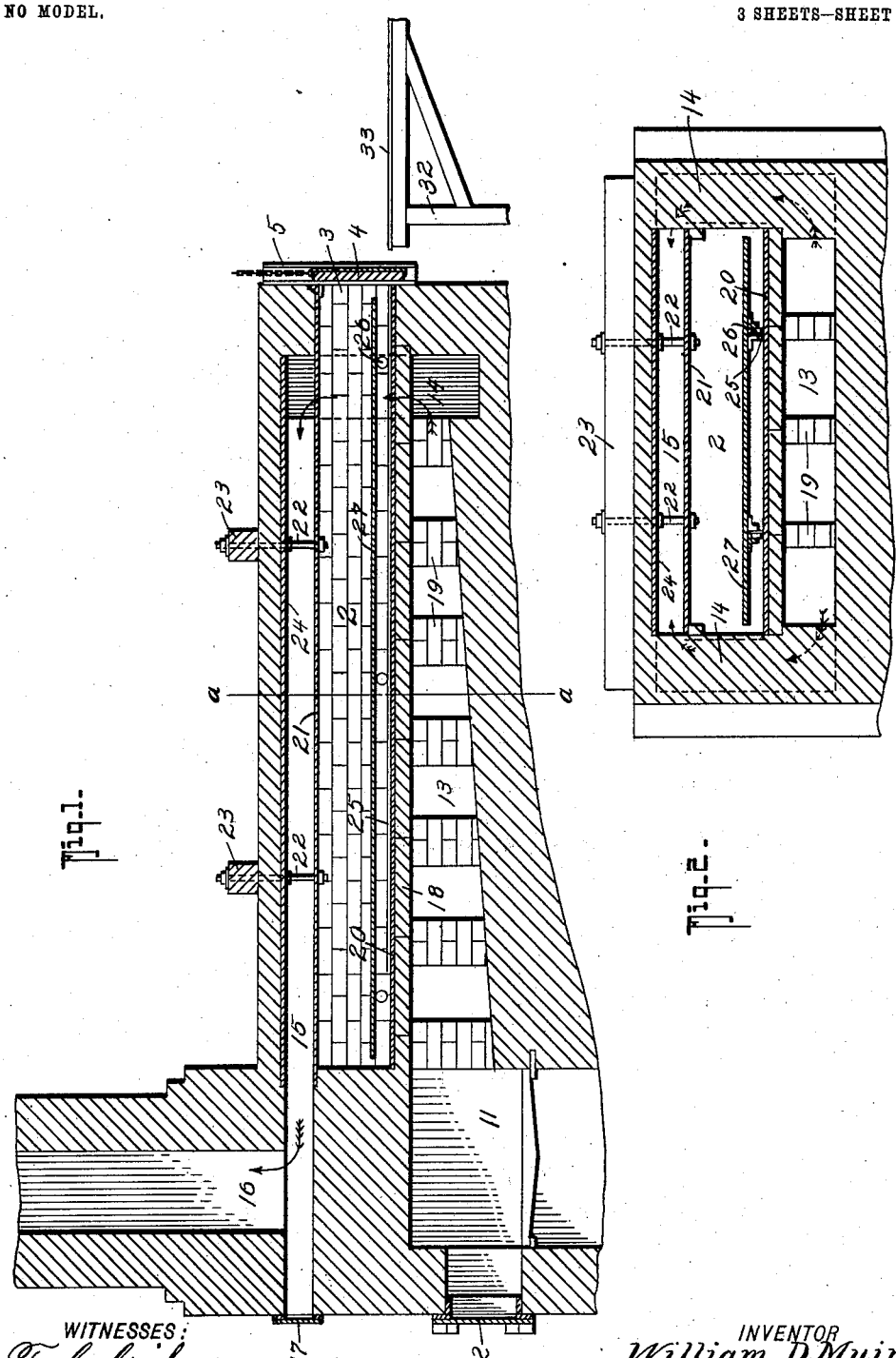

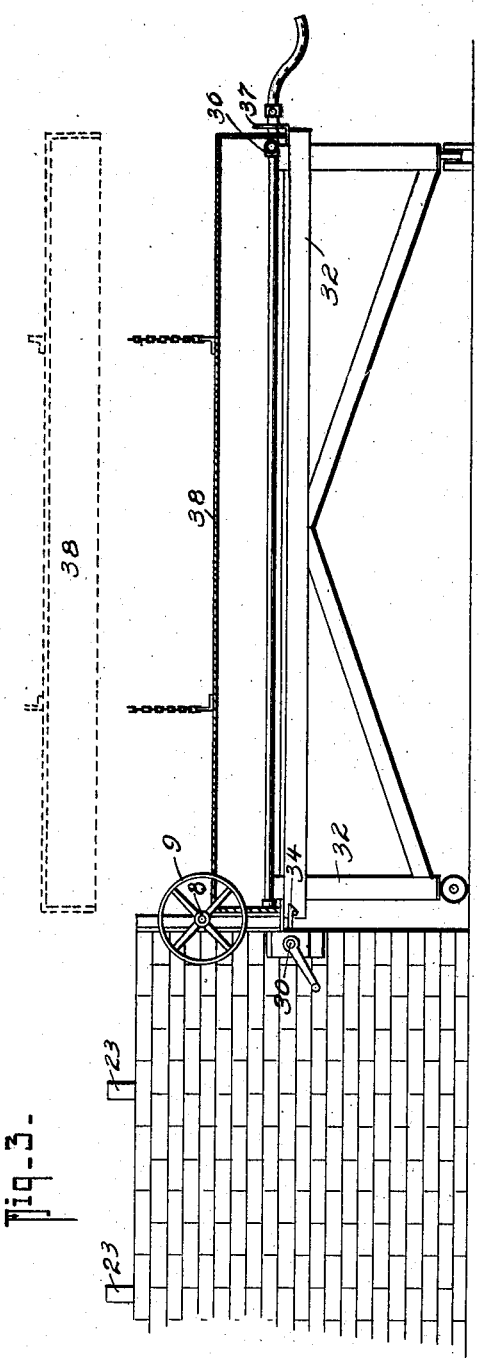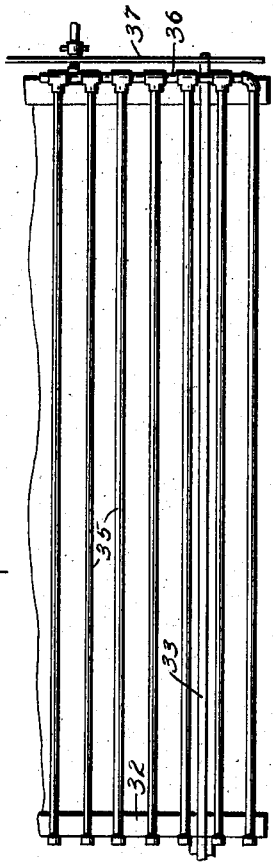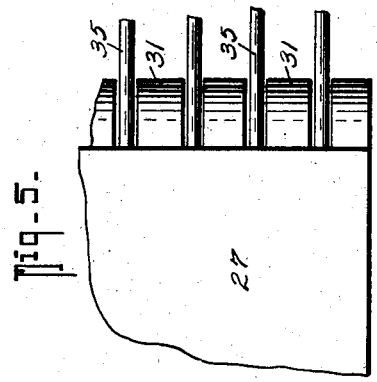

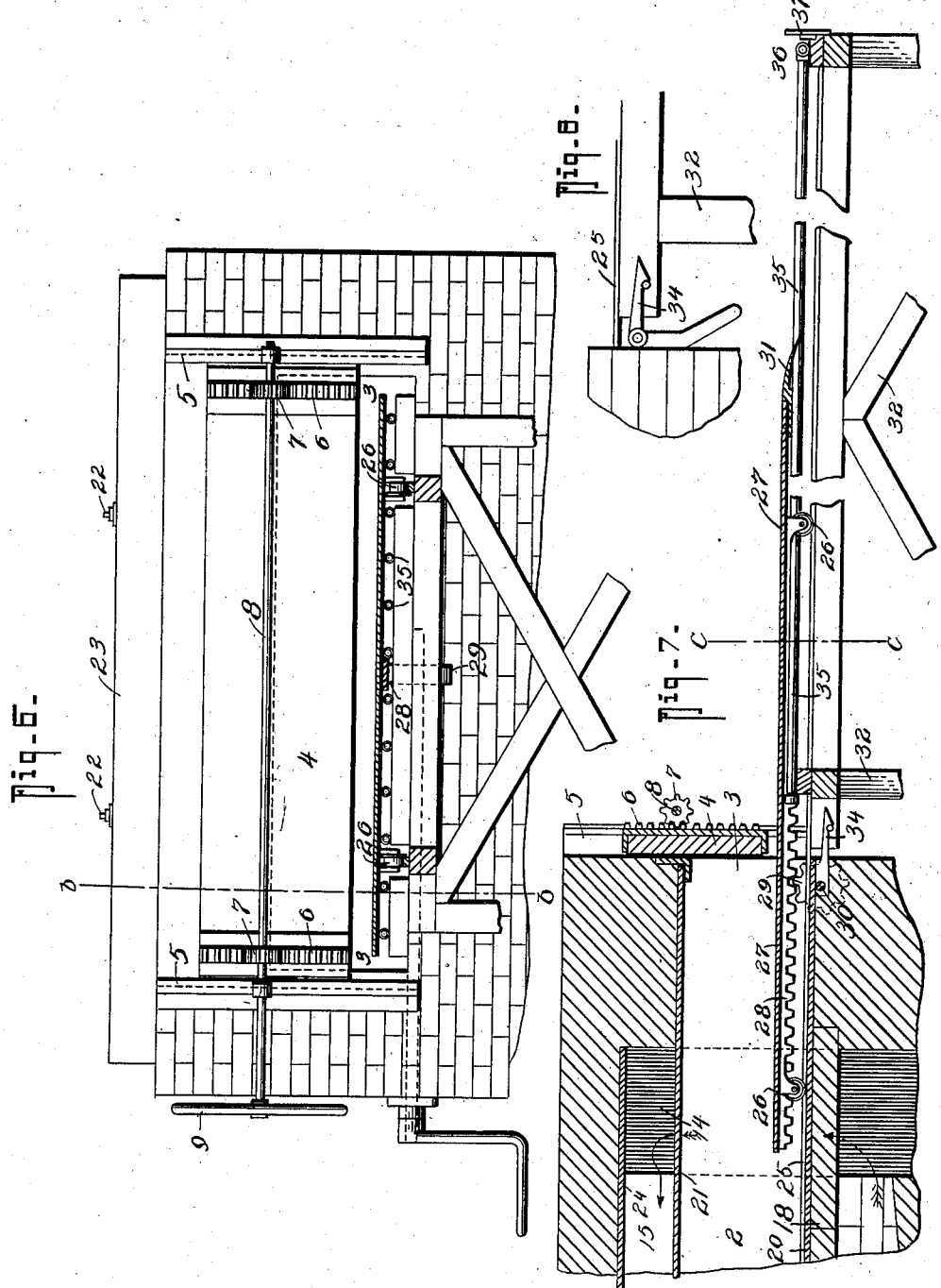

UNITED STATES PATENT OFFICE.

WILLIAM D. MUIR, OF VANCOUVER, CANADA.

BAKER'S OVEN.

SPECIFICATION forming part of Letters Patent No. 742,048, dated October 20, 1903.

Application filed June 3, 1903. Serial No. 159,961. (No model.)

*To all whom it may concern:*

Be it known that I, WILLIAM D. MUIR, a citizen of the Dominion of Canada, residing at Vancouver, in the Province of British Columbia, Canada, have invented a new and useful Improvement in Bakers' Ovens, of which the following is a specification.

This invention has for its object the improvement of that class of baker's oven known as "continuous," in that they are heated by flues in distinction to those which require to have a fire kindled within the bread-chamber itself and to be swept and cleaned out between every charge of bread, and my improvement has been directed to the provision of an oven proper or bread-chamber heated by wide shallow flues extending across the entire width and the arrangement of which is so designed that the furnace and ash-pit doors are at the back end of the oven and removed as far as possible from where the bread is made and handled, so as not to be exposed to the dirt and dust incidental to firing and flue-cleaning. The furnace-doors may in fact be in a separate apartment or outside the bakehouse entirely and covered by a separate roof.

A further object has been the provision of a steam-heated prover-table which may be placed at the mouth of the oven and inclosed with a cover to retain the heat and from which when ready for baking the bread may be transferred onto an oven draw-plate and conveyed into the oven without handling of the loaves. The same construction of the draw-plate also enables the bread when baked to be transferred without handling onto a receiving-table which may be substituted for the prover-table, both being on caster-wheels for convenience of movement about the bread-making room.

The particular construction of my oven and its related parts and the manner in which they are coöperative one with the other are fully described in the following specification and illustrated in the drawings which accompany it.

Figure 1 represents a longitudinal section through the oven and its flues; Fig. 2, a cross-section of the same on the line $a\ a$ in Fig. 1; Fig. 3, a side elevation of the prover-table; Fig. 4, a plan of a portion of the same; Fig. 5, an enlarged plan of a portion of the outer end of the oven draw-plate; Fig. 6, a front end elevation of the oven with section through draw-plate and prover-table on the line $c\ c$ in Fig. 7; Fig. 7, a longitudinal section through the front end of the oven, the draw-plate, and the prover-table on the line $b\ b$ in Fig. 6; and Fig. 8 a detail of the latch-hook for securing prover-table to oven.

On referring to Figs. 1 and 2, the bread-baking chamber of the oven is indicated by 2, and its opening or mouth 3 extends across full width and is closable with a door 4, slidable vertically in guides 5 and raised or lowered by means of a rack 6 and pinion 7, the weight of the door being counterbalanced or check-pawls provided on rack or pinions to sustain it. The pinion-shaft 8 may be rotated by means of a hand-wheel 9 or by other suitable means.

The mouth 3 of the bread-chamber 2 of the oven opens from the bread-baking room, while its heating-furnace 11 is at the opposite or back end of the oven, and its door 12 may open into a separate apartment. The flue 13 from the furnace extends across the whole width of the bread-chamber and at the end toward the oven-mouth divides into two side flues 14, one on each side of the bread-chamber, from which they are divided by thin metal partitions 10 and connect above to a horizontal flue 15, by which the top of the bread-chamber is heated and which extends across the whole width of such and communicates at the back end with the chimney-flue 16. A door 17 is provided at the back end of the top flue 15, affording direct access to it for cleaning purposes.

The floor of the bread-chamber is constructed of comparatively thin wide slabs 18, of firebrick or refractory stone, supported where necessary on piers 19 from the foundation and covered on the upper or oven side by a thin plate 20, of metal, which forms the bottom of the bread-chamber, covering the joints of the slabs and serving to distribute and equalize the heat.

The top of the bread-chamber is divided from the top flue by a thin plate 21, of metal, which may be built into the brickwork or supported thereon and supported toward the center by tension-rods 22 from timbers or girders 23, across the top of the structure.

These rods also support a similar plate 24, which forms the upper side of the flue and carrying the covering-brickwork. This construction enables a shallow flat flue to be obtained free from obstruction, thus keeping the heated gases close against the top of the oven, which, being made of metal, permits the ready conduction of the heat through it.

The direction of the furnace-gases through the flues is clearly indicated on Figs. 1 and 2 by the arrows.

On the plate-floor 20 of the bread-chamber are longitudinal rails 25, affording a rolling-surface for the wheels 26 of the oven draw-plate 27, the length and breadth of which conform to those of the bread-chamber. Similar rails are continued on the prover-table and receiving-table, which will be described later, so that the draw-plate 27 may be run out of the bread-chamber by means of a rack 28, which extends along the under side of the length of the plate and in which the teeth of a pinion 29, toward the mouth of the oven, gear. Rotation may be imparted to the pinion-shaft 30 to effect the movement of the draw-plate either in or out either by an ordinary crank-handle or by suitable power-driven gear, if power is used in the bakery.

The outer edge of the draw-plate toward the door of the oven is provided with a series of projections 31, which are curved or angled downward below the level of the bearers on which the loaves of bread are placed on the prover-table, which in these drawings consist of the heating-pipes.

The prover-table consists of a light framework 32 on caster-wheels, supporting at the approximate level of the bottom of the bread-chamber rails 33, forming a continuation of those within the bread-chamber. Across the whole upper surface of this table are a series of pipes into which steam may be admitted. The manner in which I prefer to arrange these pipes is to connect a series of longitudinal pipes 35 into a header 36, the farther ends of 35 being capped and the whole system inclined slightly downward toward the header to permit the water of condensation to either return to the boiler or be suitably trapped. The header is connected to the steam-service pipe by a removable connection and flexible hose-pipe. The prover-table is secured to the front of the oven by latches 34, which will automatically secure the prover-table to the oven-front when pushed against it in proper alinement, but may be released from one side by the operator. Across the end of the table farther from the oven-door is a stop-plate 37 to hold the bread-tins against the push of the draw-plate 27 when it is receiving its charge.

The upper surface of the prover-table may be inclosed by a cover 38, which seats over the edge of the table and confines the heat from the steam-pipes in contact with the bread. This cover is suspended by chain or other flexible connection passing around overhead pulleys and may be counterbalanced, so that when not in use it may be moved up out of the way and offer a clear headway in front of the oven. If found necessary, I may maintain a certain amount of moisture within the inclosure of the prover-table by providing small apertures in the steam-pipes which will allow a slight leakage of steam.

The receiving-table is of similar dimensions to the prover-table, being adapted to the dimensions of the oven and of its draw-plate. It is provided with rails and supported on caster-wheels at the approximate level of the floor of the bread-chamber of the oven, so that the oven draw-plate may be run out over it when it is desired to draw the charge.

The operation of the draw-plate in receiving and delivering a charge will require a little explanation. The loaves having been for a sufficient time on the prover-table, the cover 38 is lifted, the door 4 of the oven opened, and by means of the rack and pinions 28 29 the draw-plate 27 is run onto the table. The downwardly-curved projections 31 on the front edge of the draw-plate permit it to pass under the loaves or bread-tins, which are held against its push by the stop-plate 37, so that by the time the table has reached the extreme outer limit of its movement the whole charge rests on the draw-plate, to be run into the bread-chamber by a reversal of the pinion movement. When the charge has been baked, a receiving-table is run up to the oven, the door of the oven is opened, and the draw-plate run out with its charge of loaves over the receiving-table. The oven door is then partially closed to about the level of the draw-plate, and that plate is again run in, by which movement the bread being held by the oven door is left behind on the receiving-table.

It is obvious that where power is used in the bake-house the several operations of lifting the cover of the prover-table, opening the oven door, and racking out and in the draw-plate may be conveniently done by the machinery without in any way departing from my invention.

I am aware that prior to my invention flue-heated baking-ovens have been used, but they have not met with ready adoption because of the expensive nature of their construction and their extravagant use of fuel, faults which I have specially designed my oven to avoid. I am further aware that draw-plates have been used for the conveyance of bread to within and removal from the oven, but their construction has been such that they have required to be used in conjunction with prover-cupboards, and the loaves have required to be handled twice, first in placing them in the cupboards and again in transferring them from the cupboards to the draw-plate for conveyance to within the oven.

My system not only provides a convenient and economical means of proving the loaves, but the construction of the draw-plate and its operation in conjunction with the prover-table avoid the necessity of further handling after proving, as the whole charge is transferred at once quickly and conveniently to the oven, which does not require to lie idle while the charge is being arranged on the draw-plate.

What I therefore claim as my invention, and desire to be protected in by Letters Patent, is—

1. The combination with a baker's oven; a steam-heater prover-table comprising an elongated top and supporting-legs therefor, a series of longitudinally-arranged steam-pipes carried on the top of said table-top, a pair of track-rails carried on said table-top between said steam-pipes for receiving the draw-plate carriage, a removable top inclosing said pipes, and means for admitting steam to the pipes.

2. In an oven of the class described having a removable table opposite to the mouth of the bread-chamber; steam-pipes arranged along the upper surface of the table, a stop-plate across its farther end, a draw-plate mounted on wheels to run within the bread-chamber and over the table the outer edge of such draw-plate having forward projections downwardly sloped to below the upper surface of the steam-pipes, means for securing the table to the front of the oven, and means for operating the draw-plate in and out of the oven.

3. In a baker's oven; a bread-chamber having a bottom flue separated from the chamber by a thin wide slab or slabs of refractory material and a thin sheet of metal forming the floor of the bread-chamber, side flues toward the front end communicating with a top flue and divided from the bread-chamber by a thin metal partition, a thin metal partition dividing the top flue from the bread-chamber, means for supporting such partition, and means for supporting the top of the flue so as to provide a shallow flat flue.

4. In a baker's oven; a bread-chamber 2 having a slidable door 4 at one end, a furnace-flue 13 below said bread-chamber, partitions 18 and 20 separating said flue 13 from said bread-chamber 2, side flue 14 at the front end of the bread-chamber, end partitions 10 for said bread-chamber, the top flue 15 having a door 17, the partition 21 separating said top flue from said bread-chamber, the roof-plate 24 having supports 22, contact-rails 25 within said bread-chamber, the draw-plate 27 having downwardly-bent projections 31 at one end, and wheels 26 and the rack 28, said draw-plate being operated by the pinion 29 which engages its racks, for the purposes specified.

In testimony whereof I have signed my name to this specification in the presence of two subscribing witnesses.

WILLIAM D. MUIR.

In presence of—
 ROWLAND BRITTAIN,
 ELLICE WEBBER.